United States Patent [19]

Katagiri

[11] 4,097,881
[45] Jun. 27, 1978

[54] FOCUSSING APPARATUS FOR CAMERAS
[75] Inventor: Tohru Katagiri, Shimosuwa, Japan
[73] Assignee: Sankyo Kogaku Kogyo Kabushiki Kaisha, Japan
[21] Appl. No.: 710,018
[22] Filed: Jul. 30, 1976
[30] Foreign Application Priority Data
Aug. 5, 1975   Japan ................. 50-108407[U]
[51] Int. Cl.$^2$ ................. G03B 19/12; G03B 13/02
[52] U.S. Cl. ................. 354/155; 352/140; 354/201; 354/224; 355/55
[58] Field of Search ........ 354/152, 155, 195, 199–201, 354/224; 352/140; 355/55

[56]         References Cited
         U.S. PATENT DOCUMENTS
3,230,851   1/1966   Reymond ................. 354/155
3,274,912   9/1966   Kasahara ................. 354/201 X Primary Examiner—Richard A. Wintercorn
Attorney, Agent, or Firm—Cooper, Dunham, Clark, Griffin & Moran

[57]               ABSTRACT

A focussing apparatus is disclosed comprising a mask plate disposed in the path of light to a camera rangefinder and having a plurality of apertures of like configuration which are offset from the optical axis of the rangefinder. Light passing through the respective apertures forms on the focal plane of the rangefinder a number of separate images of an object photographed which are equal in number to the number of the apertures. Focussing is achieved by a displacement of a focussing lens in the taking lens system in the direction of the optical axis in a manner to bring the separate images into a single aligned image.

8 Claims, 7 Drawing Figures

FIG. I(A)
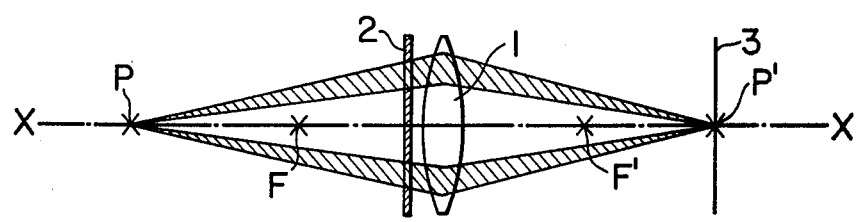
FIG. I(B)
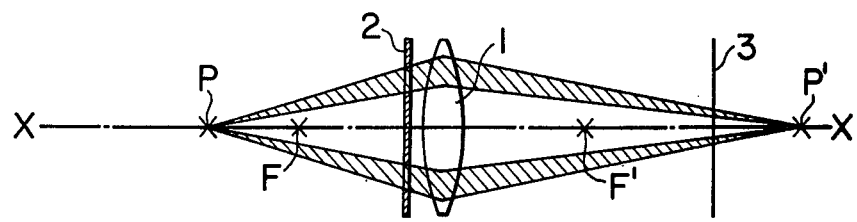
FIG. I(C)
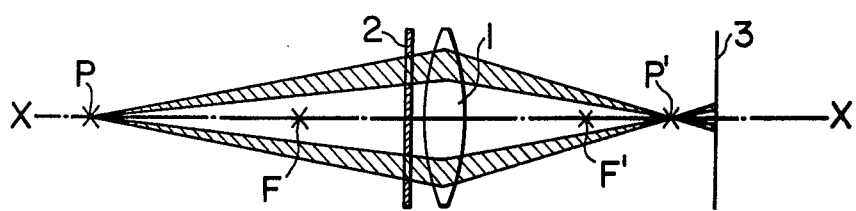

FOCUSSING APPARATUS FOR CAMERAS

BACKGROUND OF THE INVENTION

The invention relates to a focussing apparatus for cameras, and more particularly, to a focussing apparatus having a mask plate with two or more apertures which is disposed in the rangefinder optical system of a camera.

Known focussing arrangments include a matt glass technique in which an image of an object being photographed is focussed onto a frosted glass disposed on the focal plane; a micro-prism technique employing a multiplicity of very small prisms disposed on the focal plane; a split image technique employing a pair of wedge-shaped prisms, disposed side-by-side on the focal plane; and another rangefinder technique which is designed to align images of an object which pass through a pair of windows disposed side by side in front of the camera. Another focussing apparatus of dot mirror type is disclosed in U.S. Pat. No. 3,230,851. This employs a so-called dot mirror which comprises a transparent glass member on which reflective surfaces are disposed and which is disposed obliquely on the path of light so that separate rays impinge on the dot mirror in different directions to form an aligned image from images passing through the reflective and transparent surfaces, respectively. The matt glass, micro-prism and split image techniques mentioned above utilize a focussing plate which is susceptible to damage and which must be protected from deposition of dirt and dust thereon requiring extreme care during the assembly of the camera. The micro-prism and split image techniques additionally require the use of prisms of a high accuracy, which results in the expensiveness of the apparatus. The above rangefinder technique mentioned in the fourth instance is based on the double image alignment, which lends itself to the determination of a distance and facilitates the focussing operation, but suffers from a high cost which results from the complexity of the arrangement and high mechanical precision required, and is also vulnerable to the influence of temperature changes and shocks. The focussing apparatus of dot mirror type requires prisms forming the dot mirror which can only be manufactured expensively. In addition, the transmitting light through the dot mirror which is directed to a film surface represents a loss, and the aperture setting by an exposure meter tends to be inaccurate.

SUMMARY OF THE INVENTION

It is an object of the present invention to provide an improved focussing apparatus which eliminates the above disadvantages of known focussing apparatus.

It is another object of the invention to provide a focussing apparatus which is very simple in arrangement and capable of achieving an effective focussing by merely disposing a single, image separating mask plate at a suitable position in the rangefinder optical system.

Further objects of the invention will be understood from the following description of embodiments thereof with reference to the drawings.

It is the major feature of the present invention that the rangefinder optical system of a camera in accordance therewith includes a mask plate which separates the image of an object being photographed into a plurality of images. The image of the object is formed as spaced images at the primary image point of the rangefinder optical system by the taking lens system in cameras of single lens reflex type, and by an objective of the rangefinder which is separate from the taking lens system in cameras of other types. The mask plate is disposed rearwardly of the spaced images, namely, on the side thereof which is nearer the eyepiece, and is formed with at least two apertures which separate the image into at least two spaced images. It should be apparent that the number of separate space images is equal to the number of apertures formed in the mask plate. The plurality of apertures are located in the mask plate out of intersection with the optical axis of the rangefinder optical system. The images separated by the mask plate are brought into alignment at the secondary image point by a lens located rearwardly of the mask plate. The image of the object focussed as a real image on the secondary image point is viewed as enlarged by an eyepiece.

The primary image point on which the image of the object is focussed has a location which is determined by a distance between the object and the camera, and the location of the secondary image point depends on the location of the primary image point.

When the image of the object formed on the secondary image point is viewed through the eyepiece, the separate spaced images formed by the mask plate will be aligned into a single image if the image of the object is focussed on the secondary image point of a given location or if the taking lens system is properly focussed, but they will be blurred or obscure as they remain separate if the focussing is improper. Thus a proper focussing can be assured by moving the taking lens system in a manner such that the separate images form a single, sharply defined image on the secondary image point.

BRIEF DESCRIPTION OF THE DRAWINGS

FIGS. 1 (A) to (C) are schematic diagrams for illustrating the principle of the invention, FIG. 1 (A) illustrating a proper focussing and FIGS. 1 (B) and (C) illustrating out-of-focus conditions;

DETAILED DESCRIPTION OF PREFERRED EMBODIMENT

Figure 2:
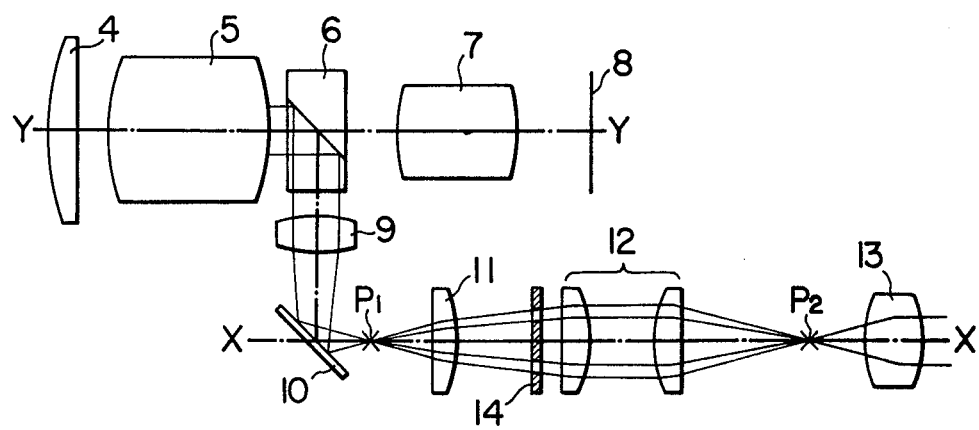
FIG. 2 is a schematic side elevation of an optical system in which the invention is applied to a movie camera of a single lens reflex type.

Referring to FIG. 1, the principle of the invention will be described first. Reference numeral 1 denotes a convex lens, 2 a mask plate having a pair of apertures which are located eccentrically with respect to the optical axis X—X, F and F' a primary and a secondary focal point of the lens 1, and 3 a focal plane. Assume now that a point object P and the focal plane 3 are conjugately positioned relative to the lens 1, as shown in FIG. 1 (A). Then light images separated by the mask plate 2 will interesect each other on the focal plane 3, whereby the images of the object P are aligned to form a focussed image. However, if the point object P is located nearer the lens than the position which is conjugate to the focal plane 3 as illustrated in FIG. 1 (B), light images from the object P tends to intersect each other at a point which is rearward of the focal plane 3, thus producing a blurred projection of two images on the focal plane 3. If, on the contrary, the point object P is further removed from the position which is conjugate to the focal plane 3 as illustrated in FIG. 1 (C), light images from the object will intersect each other at a point forwardly of the focal plane 3, again producing a blurred projection of two images on the focal plane 3. Thus it will be seen that a proper focussing can be reached by moving the lens 1 in the direction of the optical axis while viewing the focal plane 3 to find a position where the images of the object P formed on the focal plane 3 are completely aligned into a single, focussed image. Where a focussing lens is provided separately from the lens 1 at a position forwardly thereof, the focussing lens focusses its image on a point which coincides with the location of the point object P, so that a proper focussing can again be achieved by observing the focussing plane 3 to see if the images are completely aligned thereon.

Figure 3A:
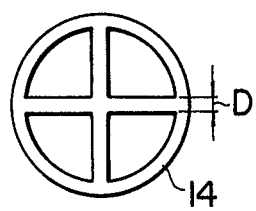
FIGS. 3 (A) to (C) are front views of various mask plates which may be used in the focussing apparatus of the invention.
Figure 3B:
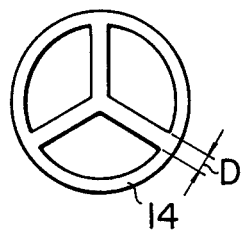
Figure 3C:
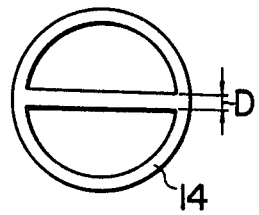

Referring to FIGS. 2 and 3, an embodiment of the focussing apparatus based on the above principle of the invention will be described below. The embodiment shown in FIG. 2 represents the focussing apparatus as incorporated into the rangefinder optical system of a movie camera which is of the single lens reflex type. The reference character Y—Y represents the optical axis of the taking lens system and X—X the optical axis of the rangefinder system. Disposed on the axis Y—Y are a focussing lens 4, an afocal variable magnification lens 5, a beam splitter prism 6, and a master lens 7, and a film 8 is disposed on the image plane which is formed by these optical elements. The beam splitter prism 6 comprises a half-silvered mirror or peak-in-mirror disposed at an angle to the optical axis so as to split part of the light passing along the optical axis and direct it through an objective 9 onto a total reflection mirror 10 which is disposed at an angle to both the path of light through the objective 9 and the optical axis X—X. Disposed on the optical axis X—X of the rangefinder are a condenser lens 11, an erect lens assembly 12 and an eyepiece 13. Located between the mirror 10 and the condenser lens 11 is a primary image point P1 where an inverted image of the object is focussed, and located between the erect lens assembly 12 and the eyepiece 13 is secondary image point P2 where an erect image of the object is focussed so as to be viewed as enlarged by the eyepiece 13. In accordance with the invention, a mask plate having a plurality of apertures of like configuration is disposed in the optical system of the rangefinder at a position nearer the object than the image point which is closest to the eyepiece 13. In the embodiment shown, the mask plate 14 is disposed at a position between the condenser lens 11 and the erect lens assembly 12 which is nearer the object than the secondary image point P2. Some examples of suitable mask plates 14a, 14b, and 14c are shown in FIGS. 3 (A) to (C), illustrating those having four, three and two apertures, respectively. However, it should be understood that various other arrangements are possible. The only requirement for the mask plate is that it comprises a light intercepting plate material in which a plurality of apertures of like configuration are formed at substantially symmetrical positions with respect to the centerline.

In operation, the image formed on the primary image point P1 is separated into a plurality of images which are equal in number to the number of apertures in the mask plate 14, which tend to intersect each other on the secondary image point P2. However, if the focussing lens 4 is improperly located to focus the image of the object at a point offset or displaced from the primary image point, there will be produced a blurred projection of the plurality of images of the object on the secondary image point P2 for view through the eyepiece 13, as mentioned previously in connection with FIG. 1. However, a proper focussing can be attained by moving the focussing lens 4 while observing the secondary image point P2 through the eyepiece 13 to find a location of lens 4 where the images are aligned into a single image. The lens 4 is fixed at such location.

The focussing process can be facilitated by increasing the spacing between the images formed under improper focussing, and this can be achieved by increasing the width D (see FIG. 3) of light intercepting areas which remain between the apertures in the mask plate 14. However, an increased width D results in a reduction in the amount of light passing to the rangefinder, and therefore a compromise need be made in the selection of values for the width D. It should be noted in this respect that a reduced value of the width D still provides an image separation. It is found from experiments that a suitable number of split images or apertures in the mask plate 14 is four. The location of the mask plate 14 may be anywhere other than the primary image point which is located between the prism 6 and the secondary image point P2. However, if vignetting occurs, a partial overlapping of images may remain under the properly focussed condition, presenting some difficulty during the focussing process. In order to avoid vignetting and to obtain a greater separation between split images, a peferred position for the mask plate 14 is where the flux deverges as illustrated in FIG. 2. Preferably, the apertures in the mask plate 14 are symmetrically arranged about the optical axis of the rangefinder and have a similar configuration and size.

It should be understood that the focussing apparatus of the invention is also applicable to twin lens reflex cameras, including both still and movie cameras.

What is claimed is:

1. A focussing apparatus for camera comprising:
    a real image rangefinder optical system having an optical axis with primary and secondary image points thereon; and
    a mask plate disposed in said optical system of the real image rangefinder between said primary and said secondary image points, said mask plate having a plurality of apertures symmetrically arranged about and out of intersection with the point of intersection between said mask plate and said optical axis of the optical system.

2. A focussing apparatus according to claim 1 in which the mask plate is located where flux from the primary image point is at its maximum divergence.

3. A focussing apparatus according to claim 1 in which the mask plate is formed with three sector-shaped apertures each having an included angle of about 120°.

4. A focussing apparatus for camera comprising:
    a focussing lens system including:
        a focussing lens for passing image light of an object being photographed along a first optical axis;
        a half-silvered mirror means disposed at an oblique position rearwardly of the focussing lens for reflecting at least a portion of said image light off said first optical axis; and
    a mirror for reflecting said image light reflected from the half-silvered mirror means in the rearward direction along a second optical axis;
    an erect lens assembly means disposed on said second optical axis for focussing the inverted image of the object being photographed, formed at a primary image point of said erect lens assembly means on said second optical axis by said focussing lens system, into an erect image at a secondary image point of the assembly means;

an eyepiece on said second optical axis for viewing said erect image at a magnification; and a mask plate interposed between the primary and the secondary image points and having at least two apertures formed therein.

5. A focussing apparatus according to claim 4 in which the mask plate is located where flux from the primary image point is at its maximum divergence.

6. A focussing apparatus according to claim 4 in which the mask plate is located immediately before the erect lens assembly means.

7. A focussing apparatus according to claim 4, further including a condenser lens disposed between the primary image point and the erect lens assembly means.

8. A focussing apparatus according to claim 7 in which the mask plate is located between the condenser lens and the erect lens assembly means.

* * * * *